United States Patent [19]

Fuchs et al.

[11] 4,072,322
[45] Feb. 7, 1978

[54] AXLE SUSPENSION SYSTEMS FOR A VEHICLE

[75] Inventors: Dietrich Fuchs, Karlsfeld; Albin Luttner, Munich, both of Germany

[73] Assignee: Maschinenfabrik Augsburg-Nurnberg Aktiengesellschaft, Munich, Germany

[21] Appl. No.: 729,417

[22] Filed: Oct. 4, 1976

[30] Foreign Application Priority Data

Oct. 14, 1975 Germany .............................. 2545904

[51] Int. Cl.² ............................................. B60G 15/00
[52] U.S. Cl. .................................... 280/713; 280/725
[58] Field of Search ....................... 280/713, 717, 725; 267/15, 20, 66

[56] References Cited

U.S. PATENT DOCUMENTS

| | | | |
|---|---|---|---|
| 3,033,591 | 5/1962 | Ward | 280/713 |
| 3,560,017 | 2/1971 | Vogel | 280/713 |

*Primary Examiner*—Philip Goodman
*Attorney, Agent, or Firm*—W. G. Fasse; W. W. Roberts

[57] ABSTRACT

This axle suspension system for a vehicle includes a stabilizer connecting the body and axle. The stabilizer is a generally rectangular frame made up of two opposed, U-shaped frame elements the distal ends of the limbs of which are connected together by flanges, preferably at the longitudinal central plane of the vehicle. One transversely extending side of the frame is pivotally connected to the axle, and the other is pivotally connected to the body and force transmitting elements connect the axle and one of said flanges and the body and the other of the flanges.

10 Claims, 4 Drawing Figures

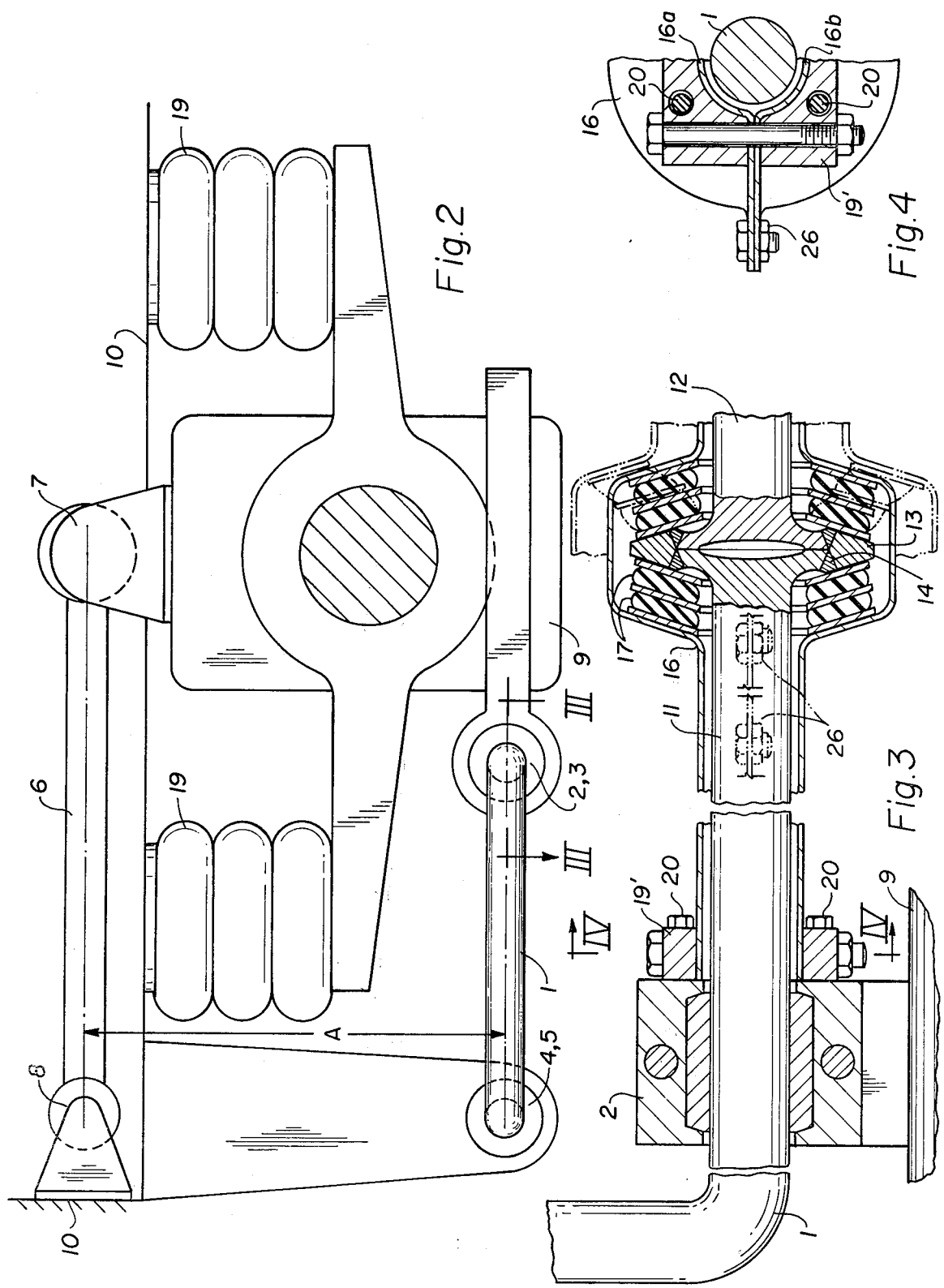

AXLE SUSPENSION SYSTEMS FOR A VEHICLE

BACKGROUND OF THE INVENTION

This invention relates to vehicles and particularly to an axle suspension system for vehicles having air or coil supported rigid axles guided in the longitudinal and transverse directions of the vhicle by means of a closed frame stabilizer pivotally connected for rotation about the transverse axis of the vehicle, to the body and to the axle of the vehicle.

An axle suspension system of this generic category is disclosed in DT-OS 2,241,203, where guidance of the axle in the transverse direction of the vehicle is achieved by providing a shoulder at each bearing point of the closed frame stabilizer to transfer lateral forces to the frame and the rear axle through suitable bearing sleeves or brackets. One of the disadvantages inherent in this suspension system is that at the part of the frame where the bending stresses are at a maximum, the cross section of the frame members is subject to great stress and the durability of the stabilizer is thus impaired accordingly. Said publication alternatively proposes to make the bearings of the frame stabilizer spherical.

Although the type of axle suspension system disclosed in said publication represents an intriguingly simple solution, it has not found general acceptance. Since manufacture of a frame stabilizer having the shoulders needed to absorb lateral forces involves prohibitive cost. Nor has the alternative version using spherical rubber bearings in lieu of the shouldered pivotal or cylindrical bearings gained recognition, for the reason that with this version, one bearing each is subjected not only to tensile and compressive stresses in the transverse and longitudinal directions but additionally also to torsional stresses in two planes, whereby an unacceptably short useful life of said spherical rubber bearings results.

OBJECTS OF THE INVENTION

In view of the foregoing, it is the aim of the invention to achieve the following objects, singly or in combination:

- to provide an axle suspension system of said generic category that may be simply manufactured, which has a simple design and can be made at acceptable cost;
- to provide a stabilizer system of sufficiently long useful life, especially of the bearing elements;
- to provide a frame stabilizer comprising a generally rectangular frame preferably composed of two U-shaped bars fitted with two connecting flanges arranged on the longitudinal center plane of the vehicle, where one each of said connecting flanges provides a basis of support for a transverse rigid force transmitting element or strut and where one said transverse element or strut is attached to the axle and the other to the body of the vehicle;
- to eliminate the shoulders at the bearing points of the frame stabilizer and make the stabilizer relatively inexpensive to manufacture and, accordingly, render the simple design of the suspension system economical and practical;
- to provide that the forces acting in the transverse direction and in the longitudinal direction of the vehicle are absorbed by separate bearing points to alleviate the load on the individual bearings considerably and extend their life accordingly;
- to achieve this while in no way relinquishing the essential advantage of an axle suspension system realized by solely a closed frame stabilizer, which advantage is the little space it requires; and
- to provide that the connecting flanges of the frame stabilizer are arranged at points where the bending stresses encountered when the body tilts relative to the axle, are zero.

SUMMARY OF THE INVENTION

According to the invention there is provided a vehicle having an axle and a body in which a closed frame stabilizer connects the axle and the body, said stabilizer comprising a generally rectangular frame, preferably made up of a pair of U-shaped frame elements. At the longitudinal center plane of the vehicle the transversely extending frame arms are each provided with an annular connecting flange. One transverse frame arm is pivotally connected to the axle and the other is pivotally connected to the body. A transversely extending, rigid force transmitting element extends between and is secured to the flange and the axle. A similar force transmitting rigid element extends between and is secured to the flange and to the body or chassis.

In a further aspect of the present invention the transverse struts of force transmitting elements are rigidly connected to the axle and the body, respectively, while they are carried at the connecting flange of the frame stabilizer through the intermediary of elastic, deformable elements admitting of limited pivotal movement of the frame stabilizer relative to the transverse struts. This arrangement provides an advantage mainly in that interconnection of the elastic elements between the transverse struts and the connecting flanges allows considerable latitude in the design of the transverse struts, there being no need to provide pivotal bearings at the transverse struts, so that, e.g., any type of hollow or solid section may be selected for those struts. Additionally, interconnection of the elastic elements, which should preferably be rubber elements, cushions transverse axle jolts and accordingly raises the riding comfort of the vehicle.

In a further aspect of the present invention one each transverse strut comprises a longitudinally split sheet metal casing enveloping the connecting flange and one each leg of a U-shaped bar, the half-shells of which casing are widened in the area of the connecting flange and are secured to the connecting flange through the intermediary of elastically deformable elements. This configuration of the transverse strut in the shape of a metal sheet casing coaxially surrounding the frame stabilizer provides a special advantage in that the transverse strut then requires only a minimum of installation space. Another advantage of the invention is that the configuration of the transverse strut in the shape of a casing substantially protects the bearings on the connecting flange from external aggression by dirt, gases or the like. The tubular construction of the transverse strut also reduces their weight.

BRIEF FIGURE DESCRIPTION:

In order that the invention may be clearly understood, it will now be described, by way of examle, with reference to the accompanying drawings, wherein:

FIG. 2 is a side view looking in the direction of the arrow II in FIG. 1;

FIG. 3 is a part sectional enlarged view taken along line III—III of FIG. 2; and FIG. 4 is a sectional view taken along line IV—IV of FIG. 3.

Figure 1:
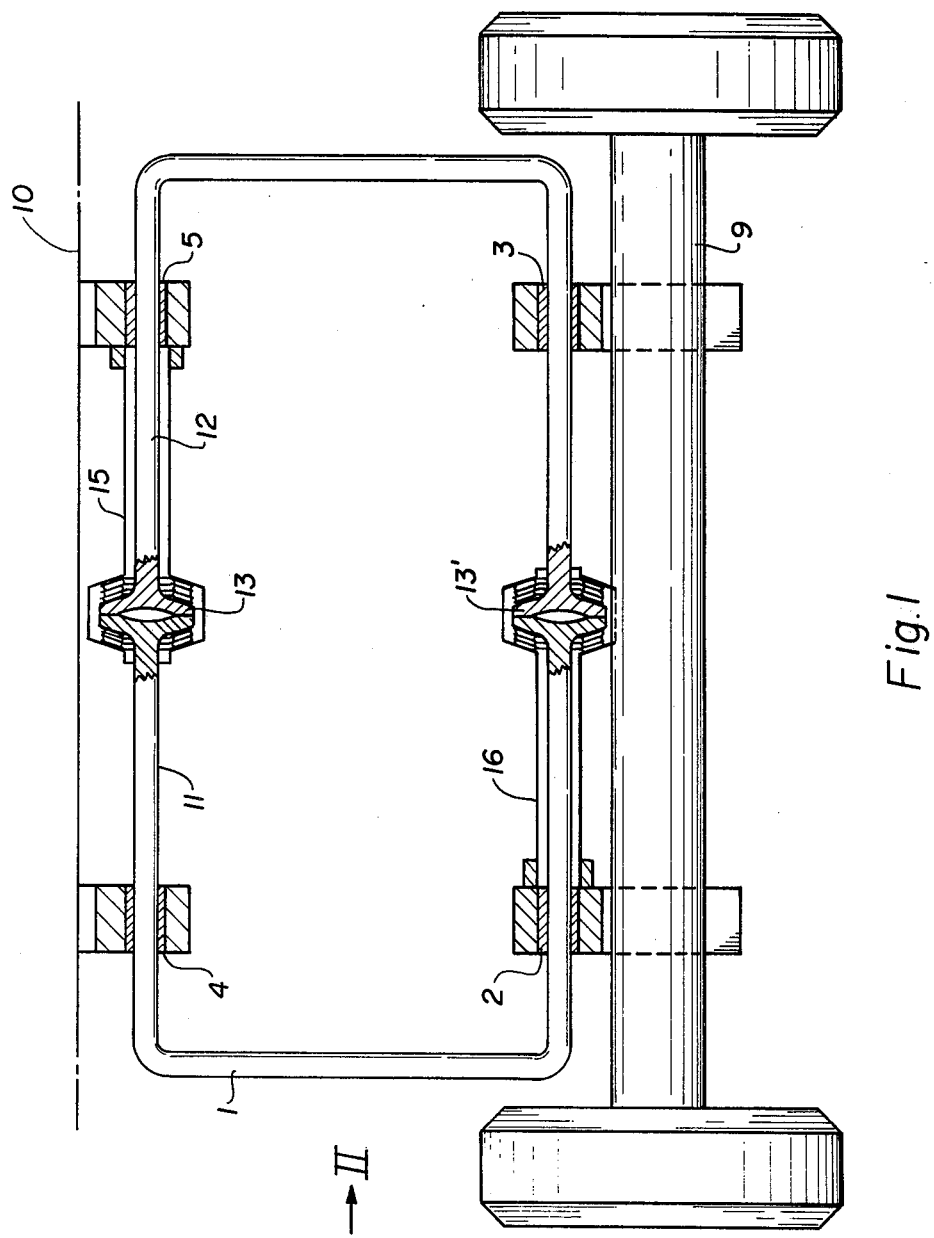
FIG. 1 is a plan view, partly in cross section, schematically illustrating an axle suspension system according to the invention.

DETAILED DESCRIPTION OF PREFERRED EXAMPLE EMBODIMENTS:

Referring to FIG. 1 the frame stabilizer 1 constitutes a rectangular, closed loop stabilizer which is pivotally connected to an axle 9 of a vehicle 10 by means of a right-hand bearing 3 and a left-hand bearing 2, and to the body of the vehicle 10 by means of further bearings 4 and 5. The two bearings 2 and 3 connecting the stabilizer to the axle and the two bearings 4 and 5 connecting the stabilizer 1 to the body 10 are, for example, torsionally flexible rubber bearings. The stabilizer 1 comprises two U-shaped frame members or bars 11, 12 the distal ends of which are provided with, and welded together at, two connecting flanges 13 (see weld 14 in FIG. 3). The connection of the U-shaped bars 11 and 12 at the connecting flanges 13 may optionally also be made by nuts and bolts.

Each of the connecting flanges 13 forms a support base for one transverse strut, for example, having the shape of a tubular casing. Thus, one transverse strut 15 is supported with its left end at the flange 13, with its right end rigidly connected to the body 10. The other transverse strut 16 is rigidly connected to the axle 9 at its left end while the right end is supported at the flange 13'.

In FIG. 2 the bearing details of the frame stabilizer 1 are not shown. However, the cushioning or spring suspension of the axle 9 relative to the vehicle body 10 by means of air-spring bellows 19 is shown along with the pivoting of the axle 9 to the body 10 by means of a further longitudinal pivot link 6 in a horizontal plane. The horizontal plane of the frame stabilizer 1 is spaced from the horizontal plane of the link 6 by the distance A. The longitudinal pivot link 6 is journaled in a bearing 7 connected to the axle 9 and in a bearing 8 connected to the body. For clarity of illustration, the link 6 has been omitted in FIG. 1.

The enlarged sectional view of FIG. 3 illustrates details of the bearing features of the transverse strut 16. The transverse strut 16 is capable of taking up forces directed across the longitudinal vehicle axis and comprises a longitudinally separated sheet metal casing enveloping one leg of the U-shaped bar 11. The casing 16 is formed of two half-shells 16a and 16b (see FIG. 4). In the area of the U-shaped bar 11 the casing or transverse strut 16 is shown in an operable condition, i. e., the two half-shells 16a and 16b are clamped together along a mounting flange and the annular rubber elements 17 are under a biasing pressure. In the area of the U-shaped bar 12 the same arrangement is shown in dash-dotted lines, before the half-shells 16a and 16b are clamped together. In this condition, the rubber elements 17 are relaxed and therefore occupy a larger diameter space. The clamping means for the two half-shells 16a and 16b in FIG. 3 may comprise more than two tension bolts 26 arranged in a row. A plurality of such bolts and nuts 26 may be provided along a connecting flange of the two half-shells 16a and 16b. The rigid connection of the transverse strut 16 to the axle 9 of the vehicle is accomplished by two clamping jaws 19 gripping the sheet metal casing of the transverse strut 16. The jaws 19 in turn are screwed to the bearing support of the bearing 2, which is connected to the axle, by means of suitable screws 20.

The construction of the transverse strut 15 is the same as that of the transverse strut 16, except that transverse strut 15 is rigidly connected to the body 10 through the bearing support of the bearing 5.

Although the invention has been described with reference to specific example embodiments, it will be appreciated, that it is intended to cover all modifications and equivalents within the scope of the appended claims.

What is claimed is:

1. An apparatus for supporting a vehicle body having a longitudinal axis, an axle means extending transversely to said longitudinal axis, comprising stabilizer means for connecting the vehicle body to said axle means, said stabilizer means comprising frame means including two frame members, each member including a respective first and second arm, means rigidly interconnecting corresponding arms to each other at one end thereof, said first and second arms also extending transversely of said longitudinal axis, flange means interconnecting the opposite ends of the first arms to each other and also the opposite ends of the second arms to each other, means pivotally mounting said first arms to said body and said second arms to said axle, first and second rigid force transmitting means connected to the respective flange means at one end of the first and second force transmitting means, while the other end of the first force transmitting means is connected to the vehicle body and the other end of the second force transmitting means is connected to the axle.

2. The apparatus of claim 1, wherein said frame members are U-shaped to form a rectangular frame, whereby the distal ends of said frame member arms are disposed adjacent to a plane extending vertically through said longitudinal axis.

3. The apparatus of claim 2, wherein the distal end of each arm is provided with an annular flange member whereby two connected flange members form said flange means.

4. The apparatus of claim 1, wherein each of said first and second force transmitting means is connected to the respective flange by an elastically deformable element permitting a limited movement of said force transmitting means relative to said stabilizer means.

5. The apparatus of claim 1, wherein said force transmitting means each comprises a tubular structure disposed about at least a portion of a respective arm of the stabilizer means.

6. The apparatus of claim 5, wherein each tubular structure comprises two half-shell elements including rim means, and means connecting said rim means to each other.

7. The apparatus of claim 5, wherein each tubular structure has a widened portion enclosing the respective flange means, said apparatus further comprising elastically deformable means interposed between said widened portion of the tubular structure and said flange means.

8. The apparatus of claim 1, further comprising first bearing means disposed on opposite sides of said flange means to connect said stabilizer means to said vehicle body, and second bearing means also disposed on opposite sides of said flange means to connect said stabilizer means to said axle.

9. The apparatus of claim 8, wherein said force transmitting means extend between and are secured to said respective flange means and said respective bearing means.

10. The apparatus of claim 1, wherein said first and second force transmitting means extend away from their respective flange means in opposite directions.

* * * * *